INVENTOR.
ROBERT H. PINTELL
BY
Karl G. Ross
AGENT

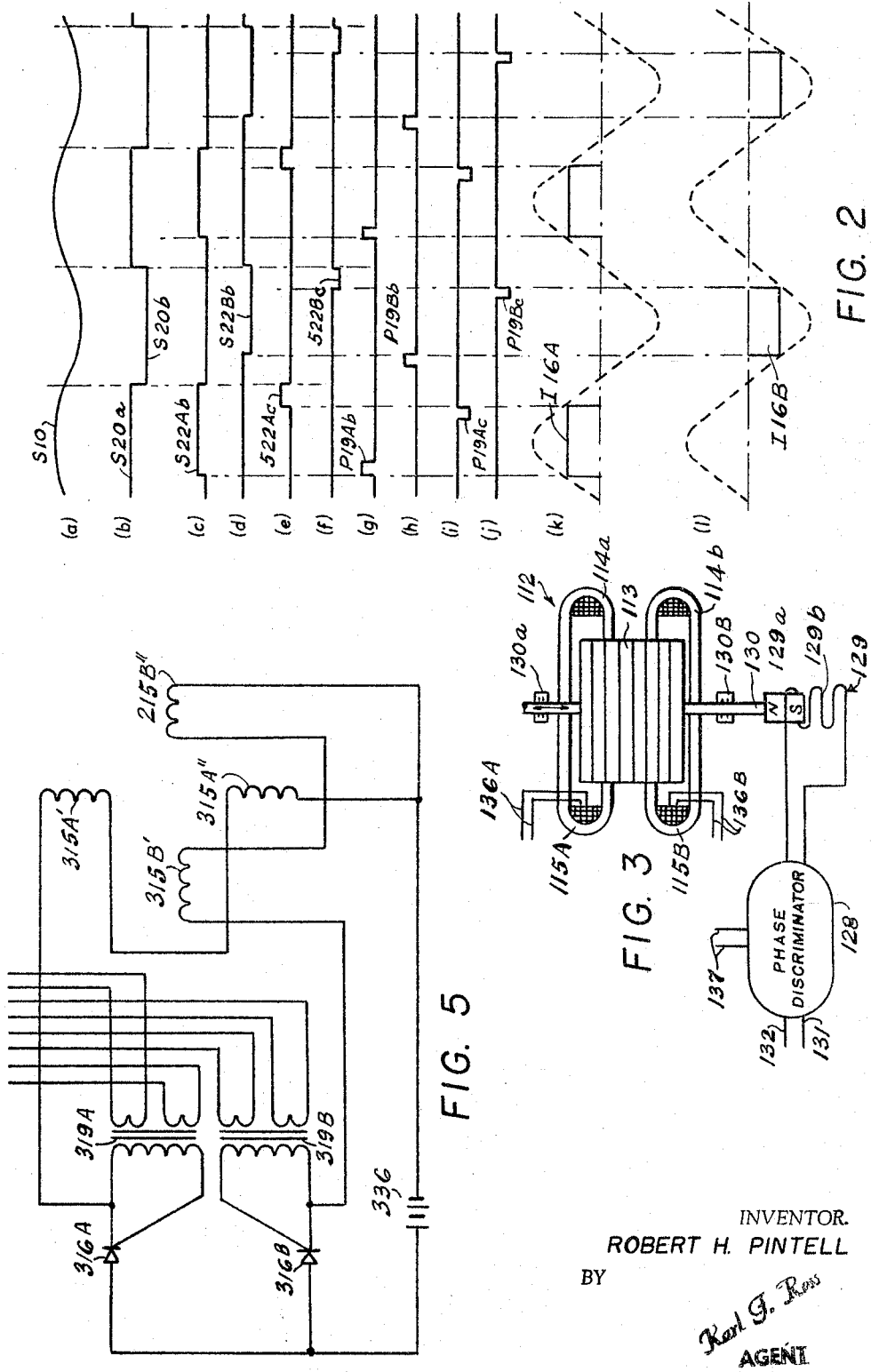

INVENTOR.
ROBERT H. PINTELL
BY
Karl F. Ross
AGENT

# United States Patent Office 3,268,789
Patented August 23, 1966

3,268,789
CONTROL SYSTEM FOR ELECTROMAGNETIC MOTORS
Robert H. Pintell, Bronx, N.Y., assignor to Intron International, Inc., Bronx, N.Y., a corporation of New York
Filed July 5, 1963, Ser. No. 292,883
20 Claims. (Cl. 318—314)

My present invention relates to a system for the controlled energization of electromagnetic motors by a source of alternating or pulsating voltage. As herein used, the term "motor" is intended to cover any machine adapted to carry out a periodic motion, whether such machine be equipped with a rotatable armature or with an oscillatable one.

In my copending application Ser. No. 117,170, now Patent Number 3,178,625 filed June 14, 1961, I have disclosed a synchronous electromagnetic motor with rotary armature to which a driving torque is imparted by an array of starter poles whose windings are alternately energized, via respective rectifiers of opposite polarity, at different half-cycles of an associated alternating-current source. It is an object of my present invention to provide means for effectively controlling the energization of such a motor so that the current supplied to its windings will always be commensurate with the load, i.e. will be neither wastefully excessive nor insufficient to let the armature keep pace with the rotating electromagnetic field.

A related object of my instant invention is to provide similar control means for motors of the asynchronous or induction type whose armature is entrained by the rotating field with a certain degree of slip which varies with the load, it being therefore desirable to compensate for these variations if a constant rotative speed is to be maintained.

In my copending application Ser. No. 120,583, now Patent Number 3,207,931 filed June 29, 1961, I have disclosed a system for energizing a load with alternating current in the form of rectangular pulses whose duration is selectively varied in accordance with the degree of energization desired. In that system, as also in its modification constituting the subject matter of my U.S. Patent No. 3,088,075 issued April 30, 1963, the current pulses are foreshortened by changing the time position of their trailing edges within each half-cycle of an alternating reference voltage while maintaining their leading edges in a fixed time position within the cycle, i.e. substantially at the beginning of each half-cycle. Though a system of the type referred to is useful for most kinds of loads, the variations in power factor due to the relative dephasing of the current pulses and the driving voltage are a drawback in some instances; moreover, with certain loads such as the aforedescribed synchronous motor, whose armature tends to line up with the in-phase component of the rotating field, the flow of quadrature currents gives rise to a so-called bumping effect in that a retarding force is intermittently exerted upon the armature as it approaches successive poles. This invention, therefore, has as a further object the provision of a more smoothly operating current-control system for synchronous motors and similar loads.

One of the features of my present invention is the provision of a circuit arrangement for the controlled energization of a load impedance, such as an electromagnetic coil, wherein the current flow to that impedance is alternately blocked and unblocked by a gating device which receives an unblocking signal in the first half and a blocking signal in the second half of each half-cycle of an alternating timing voltage in which this gating device is designed to conduct, the period of conductivity being centered within the voltage half-cycle by virtue of the fact that the two signals occupy symmetrical time positions in that half-cycle. With two load impedances, such as two stator coils in a motor-control system of the type disclosed in my copending application Ser. No. 117,170, there may be two such gating devices in the form of alternately energized electronic valves, e.g. a pair of thyratrons of the ionization or the solid-state type. These devices, being unidirectionally conductive, can be respectively assigned to alternate half-cycles of an A.C. driving source in step (or identical) with the timing-voltage source so that each device will pass current during a portion of every other half-cycle only; they can, however, also be connected in the same sense across a source of direct current. The blocking and unblocking signals are advantageously two interleaved pulse trains of predetermined cadence derived from the source of reference or timing voltage with the aid of a magnetic amplifier as disclosed in my copending application Ser. No. 120,583 and Patent No. 3,088,075.

With the use of either gas-filled or solid-state three-electrode devices as the gating means, the unblocking signal may be a trigger pulse applied to a control electrode whereas the blocking signal could be a quenching pulse adapted to render conductive a circuit element connected in shunt with the gating device (as in my application Ser. No. 120,583) or to render nonconductive a circuit element connected in series therewith (as in my Patent No. 3,088,075). I prefer, however, to utilize for this purpose the recently developed solid-state controlled rectifiers with gate turn-off wherein conductivity can be established and discontinued by pulses of opposite polarity applied to a single control electrode.

According to the disclosures of my prior application Ser. No. 120,583 and Patent No. 3,088,075, the width of the current pulses and, therefore, the selected level of energization of the load are stabilized by feedback from a secondary winding of an output transformer, such feedback being of course dependent upon the amplitude of the output current. In accordance with another feature of my instant invention, applicable to systems for energizing electromagnetic motors as hereinabove defined, I prefer to employ a more direct way of stabilizing the rate of periodic motion of such motor by coupling the latter with a generator of electric oscillations whose output will then be angle-modulated in dependence upon the phasing of that motion with reference to the source voltage. The term "angle modulation" is understood in the art as encompassing both frequency and phase modulation, the former occurring in the case of a variable-slip induction motor whereas the latter will be present with synchronous motors. The magnitude and sign of the modulation will, in either case, be indicative of any disparity between the magnitude of the electromagnetic field and the reaction force of the load. In an induction motor, for example, the rotor speed will decrease with overload and will increase with overenergization, whereas in a synchronous motor the rotor armature will lead the field with excessive current and will lag behind it when the current supply is inadequate. A suitable discriminator, therefore, will deliver a signal of proper magnitude and polarity to the timing-pulse generator to compensate for departures of the load motion from a predetermined frequency or phase (with reference to the source voltage or pulse cadence) by causing a shifting of its pulses to increase or decrease the duration of each current pulse, and thereby the average rate of current flow, as required to restore the system to substantially its optimum operating condition.

The invention will be described in greater detail with reference to the accompanying drawing in which:

FIG. 2 is a set of graphs illustrating the mode of operation of the system shown in FIG. 1;

Figure 1:
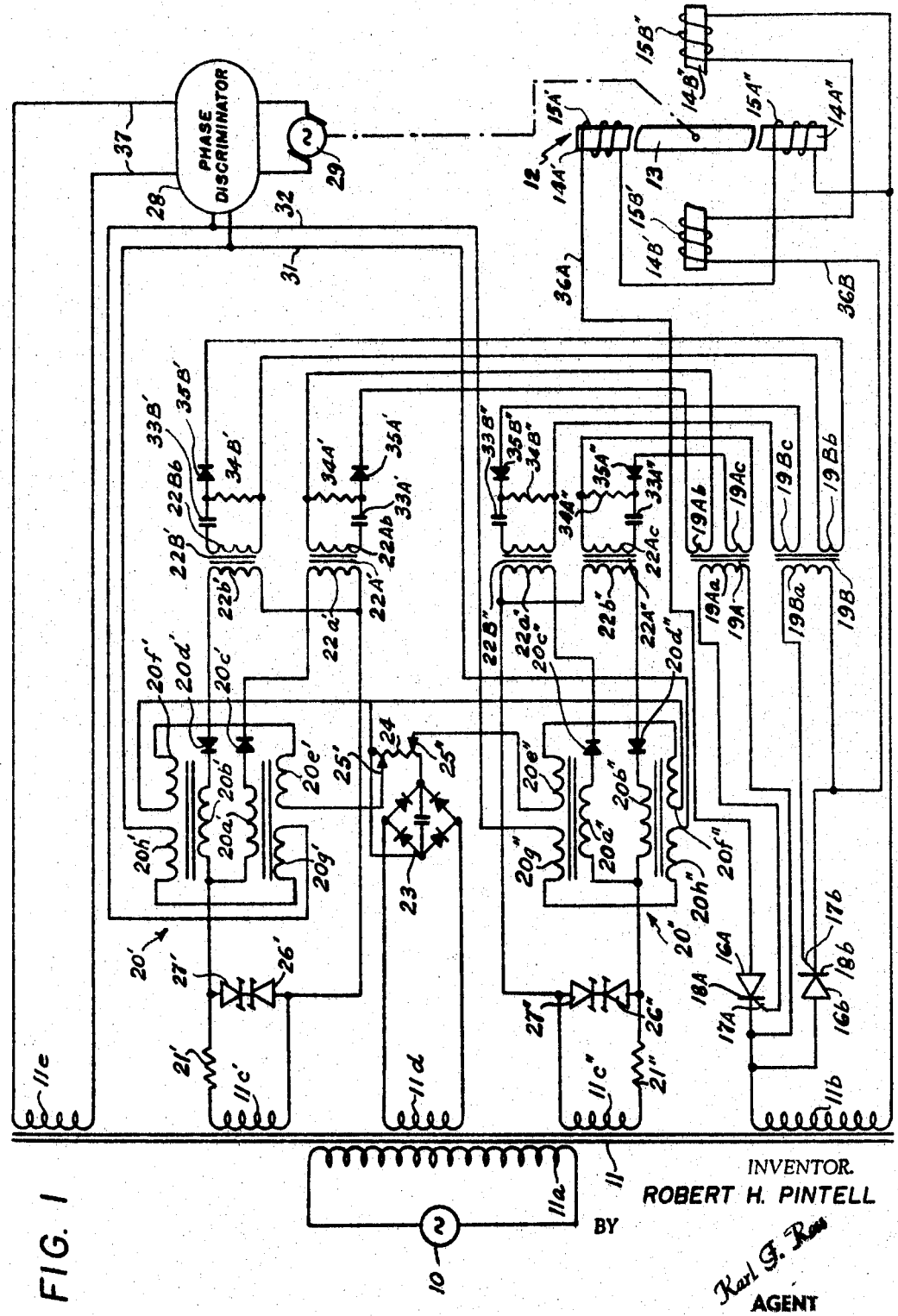
FIG. 1 is an overall circuit diagram of a system for driving a synchronous motor in accordance with this invention.
Figure 4:
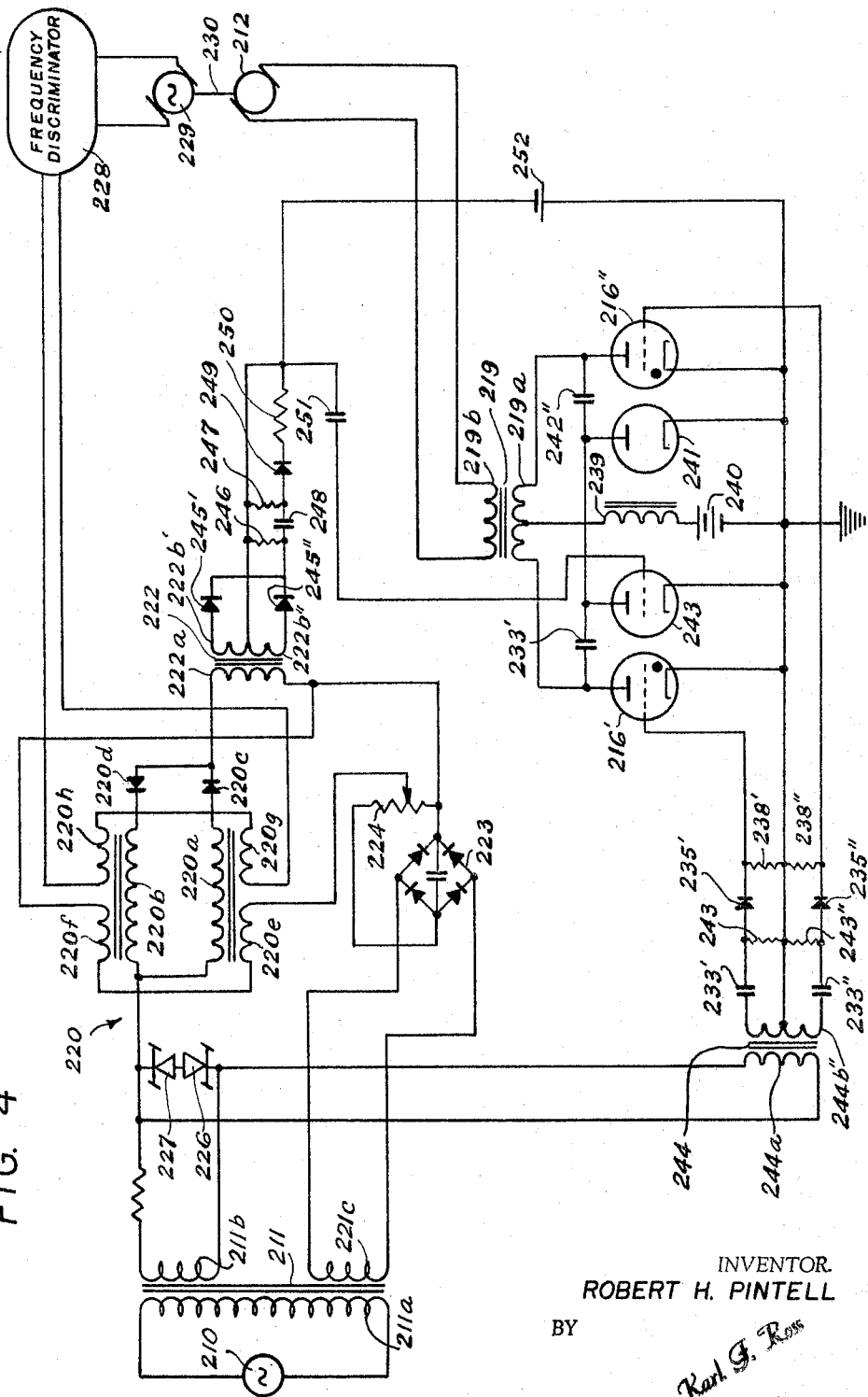

FIG. 3 diagrammmatically illustrates the application of the principles of my invention to a different type of electromagnetic motor, i.e. a vibrator;

FIG. 4 is a circuit diagram of a system similar to that of FIG. 1 but utilized in conjunction with an induction-type motor; and FIG. 5 shows a partial modification of the system of FIG. 1.

The system shown in FIG. 1 comprises a source 10 of preferably stabilized alternating voltage, connected across the primary winding 11a of a transformer 11. This transformer has several secondary windings including a power winding 11b, a pair of control windings 11c', 11c'', an auxiliary winding 11d and a reference winding 11e. Winding 11b supplies power to a load 12 here shown as a synchronous motor with a soft-iron armature 13, a first pair of diametrically opposite poles 14A', 14A'' and a second pair of diametrically opposite poles 14B', 14B''. The faces of these poles adjacent the orbit of armature 13 may be skewed to provide a preferred direction of rotation (here counterclockwise, as indicated by the arrow). Poles 14A', 14A'' carry respective coils 15A', 15A'' connected in series to form, in effect, part of a single electromagnetic winding; another such winding is constituted by coils 15B', 15B'' wound on the poles 14B' and 14B''.

The windings 15A', 15A'' and 15B', 15B'' are connected across the secondary transformer winding 11b via respective energizing circuits 36A, 36B including oppositely poled electronic gating devices 16A and 16B. These gating devices are a pair of electrode rectifiers of the aforedescribed gate-turn-off type whose gates or control electrodes 17A, 17B are returned to the associated cathodes 18A, 18B via the secondary windings 19Aa, 19Ba of respective coupling transformers 19A, 19B. Each of these transformers has a pair of primary windings designated 19Ab, 19Ac in the case of transformer 19A and 19Bb, 19Bc in the case of transformer 19B.

Transformer windings 11c', 11c'' serve to energize a pair of magnetic amplifiers 20', 20'' whose main windings 20a', 20b' and 20a'', 20b'', in series with individual diodes 20c', 20d' and 20c'', 20d'', are branched between a current-limiting resistor 21', 21'' and a pair of primary windings 22a', 22b' and 22a'', 22b'' of respective output transformers 2A', 2B' and 2A'', 22B''. A full-wave rectifier 23 is bridged across auxiliary winding 11d and supplies a potentiometer 24 whose sliders 25', 25'' deliver an adjustable direct current to a pair of biasing windings 20e', 20f' and 20e'', 20f'' of each magnetic amplifier 20', 20''. Two inversely poled Zener diodes 26', 27' and 26'', 27'' are connected across the combination of elements 11c', 21' and 11c'', 21'', respectively, to convert the sinusoidal transformer current into a succession of clipped rectangular pulses.

Transformer winding 11e supplies, via a circuit 37, reference current to a phase discriminator 28 which also receives an alternating current of like frequency from a generator 29 coupled via a linkage 30 with the armature shaft of motor 12. Phase discriminator 28 produces a direct-current output signal of either polarity on a pair of conductors 31, 32 which form part of respective control circuits for the magnetic amplifiers 20', 20''. The control circuit of magnetic amplifier 20' includes a pair of feedback windings 20g', 20h'; the analogous circuit of magnetic amplifier 20'' similarly includes a pair of feedback windings 20g'', 20h''.

Transformer 22A' has a second winding 22Ab working into a differentiation circuit which includes a series condenser 33A' and a shunt resistor 34A', this circuit being connected across winding 19Ab of transformer 19A in series with diode 35A'. Transformer 22B' similiarly has a secondary winding 22Bb connected across winding 19Bb of transformer 19B by way of a differentiation circuit 33B', 34B', and a diode 35B'. The analogous elements of two further circuits, extending from secondary winding 22Ac of transformer 22A'' to winding 19Ac of transformer 19A and from secondary winding 22Bc of transformer 22B'' to winding 19Bc of transformer 19B, are condensers 33A'', 33B'', resistors 34A'', 34B'' and diodes 35A'', 35B''.

The operation of the system shown in FIG. 1 will now be described with reference to FIG. 2.

Graph 2(a) shows the output voltage S10 of source 10 and is also representative of the current in transformer primary 11a assumed to be substantially in phase therewith. The stepped wave of graph 2(b) consists of alternate positive and negative rectangular pulses S20a and S20b respectively traversing the main windings 20a', 20a'' and 20b', 20b'' of magnetic amplifiers 20' and 20'', the shape of these pulses being due to the clipping action of the Zener diodes 26', 26'' and 27', 27''.

Graphs 2(c) and 2(d) show current pulses S22Ab and S22Bb which pass through the windings of transformers 22A'' and 22B'', respectively, and whose leading edges have been delayed with reference to those of pulses S20a, S20b by an interval depending upon the saturation of magnetic amplifier 20' by the combined action of the biasing current from bridge 23, passing through windings 20e' and 20f', and the signal current (if any) delivered to feedback windings 20g', 20h' by phase discriminator 28. Graphs 2(e) and 2(f), similarly, show current pulses S22Ac and S22Bc traversing the windings of transformers 22A'' and 22B'', respectively, as derived from pulses S20a, S20b by a delay of their leading edges in keeping with the biasing current flowing through windings 20e'', 20f'' and the signal current, if any, applied to windings 20g'', 20h'' by phase discriminator 28. It will be noted that the leading edges of each pulse pair S22Ab, S22Ac and S22Bb, S22Bc are symmetrically disposed with reference to the positive and negative peaks of voltage wave S10. Graphs 2(g) and 2(h) show trains of positive unblocking pulses P19Ab and P19Bb, derived from the leading edges of pulses S22Ab and S22Bb by the differentiation circuits 33A', 34A' and 33B', 34B', which are applied through the rectifiers 35A', 35B' to the transformer windings 19Ab and 19Bb, respectively. Graphs 2(i) and 2(j) show trains of negative blocking pulses P19Ac and P19Bc, derived from the leading edges of pulses S22Ac, S22Bc by the differentiation circuits 33A'', 34A'', and 33B'', 34B'', which are applied through the rectifiers 35A'', 35B'' to the transformer windings 19Bb and 19Bc, respectively.

Graphs 2(k) and 2(l), finally, show current pulses I16A, I16B as passed by the controlled rectifiers 16A and 16B to energize the windings 15A', 15A'' and 15B', 15B'', respectively. It will be seen that these current pulses are essentially in phase with the voltage wave S10 of graph 2(a), being centered within the respective half-cycles thereof.

It may be assumed that the sliders 25' and 25'' of potentiometer 24 have been so adjusted that the biasing current through windings 20e', 20f' or 20e'', 20f'' produces the pulse positions of graphs 2(g)–2(j) in the absence of any output of phase discriminator 28. If, now, a lagging of armature 13 due to overload produces an output voltage on conductors 31, 32 of such a polarity that the current passing through windings 20g', 20h' bucks the biasing current in windings 20e', 20f', thereby partly desaturating the magnetic amplifier 20', and that the current passing through windings 20g'', 20h'' aids the biasing current in windings 20e'', 20f'', thereby reinforcing the saturation of magnetic amplifier 20'', pulses P19Ab and P19Bb will be advanced whereas pulses P19Ac and P19Bc will be commensurately delayed to broaden the current pulses I16A, I16B and, in this manner, to increase the energization of the stator windings of motor 12 to compensate for the overload. Conversely, if the armature 13 should lead the field, the inverted output of phase discriminator 28 would have the opposite effect of retarding pulses 19Ab, 19Bb and advancing pulses 19Ac, 19Bc to a like extent, thereby reducing the width of current pulses I16A and I16B.

FIG. 3 illustrates the application of the aforedescribed principles to a load 112 in the form of an axial vibrator whose shaft 130 carries a paramagnetic armature 113, of laminated soft iron or other magnetizable material, disposed in the field of a pair of electromagnetic coils 115A, 115B partly surrounded by magnetically permeable supporting yokes 114A, 114B. Shaft 130 is axially slidable in bearings 130a, 130b and carries a permanently magnetic core 129a surrounded by a winding 129b, the elements 129a, 129b diagrammatically representing an oscillation generator 129 which feeds a phase discriminator 128.

As the coils 115A, 115B are alternately energized via circuits 136A, 136B in a manner analogous to that described in connection with the system of FIG. 1, shaft 130 with armature 113 oscillates linearly along its axis and generator 129 produces an alternating signal voltage of a frequency corresponding to that of the primary source 10 (FIG. 1) from which a reference current is supplied to discriminator 128 by way of a circuit 137. The output of phase discriminator 128, which of course may include suitable phase-shifting means to compensate for phase differences between its two inputs when the vibrator 112 oscillates normally, is again a direct-current signal of either polarity appearing on conductors 131, 132 from which it can be applied to a pair of magnetic amplifiers in the manner and for the purpose previously discussed. Thus, the vibrator 112 may be regarded as a synchronous motor, substantially equivalent to motor 12 of FIG. 1, which will lag or lead the applied field according to the ratio of the electromagnetic driving force and the mechanical load resistance reacting upon its armature. The operation of the system in compensating for overloads or overenergization will, therefore, be analogous to that described for the motor 12 of the preceding embodiment. Advantageously, vibrator 112 and its load should be substantially free from resilient elements which would confer upon the vibratory mass a natural frequency toward which it would gravitate in the absence of a strong driving force, thereby falling out of step with the applied field.

FIG. 4 illustrates a modification of my present system using a gating circuit similar to that disclosed in my application Ser. No. 120,583. Source 210, connected across the primary winding 211a of transformer 211, energizes two secondary windings 211b, 211c of which the former drives a magnetic amplifier 220 having main windings 220a, 220b, diodes 220c, 220d, biasing windings 220e, 220f traversed in series by direct current derived from winding 221c by way of a rectifier bridge 223 and a potentiometer 224, and feedback windings 220g, 220h connected across the output of a frequency discriminator 228. The current supplied to windings 220a, 220b is again clipped by a pair of oppositely poled Zener diodes 226, 227. This current also reaches the primary winding 244a of a transformer 244 whose split secondary winding 244b', 244b'' feeds two differentiation circuits 233', 234' and 233'', 234''. A pair of gas thyratrons 216', 216'' have their control grids connected to the junctions of elements 233', 234' and 233'', 234'', respectively, via respective rectifiers 235', 235''; the grid-cathode circuit of each thyratron includes a respective resistor 238', 238''. The plates of the thyratrons 216', 216'' are interconnected through the primary winding 219a of a transformer 219 whose center tap is returned to the thyratron cathodes by way of a choke 239 and a source of plate current shown as a battery 240. A vacuum diode 241 is connected between the grounded negative terminal of battery 240 and the junction of a pair of condensers 242', 242'', which in turn are tied to the respective plates of thyratrons 216' and 216'', with such a polarity as to oppose the charging of these condensers from the battery.

The secondary winding 219b is connected across the field windings of a motor 212 assumed to be of the induction type; shaft 230 of motor 212 drives an oscillation generator 229 which feeds the frequency discriminator 228.

A vacuum triode 243 is connected in shunt with diode 241 to act as a quenching element for the thyratrons 216', 216''. As these thyratrons are alternately rendered conductive by pulses from rectifiers 235' and 235'', respectively, they give rise to current pulses similar to those shown at T', T'' in FIGS. 2(h) of application Ser. No. 120,583 and Patent No. 3,088,075. That is to say, these current pulses are varied in width merely by a shifting of their trailing edges due to an advance or a delay of trigger pulses applied to the grid of vacuum triode 243 by the magnetic amplifier 220. The output of this magnetic amplifier energizes the primary winding 222a of a transformer 222 whose split secondary winding 222b', 222b'' energizes, by way of diodes 245' and 245'', a differentiation network including two resistors 246, 247, a series condenser 248 and a further rectifier 249 working into the parallel combination of a resistor 250 and a capacitor 251. A small biasing battery 252 is connected between ground and resistor 250 to insure normal cut-off of tube 243. If the slip of motor 212 becomes excessive, the departure of the output of generator 229 from a reference frequency actuates the discriminator 228 to produce a direct current of suitable polarity to intensify the saturation of magnetic amplifier 220 in order to delay the quenching pulses passed by the rectifier 249 which briefly render the tube 243 conductive to deionize whichever thyratron 216', 216'' had been operating. In this manner the period of conductivity of the thyratrons is lengthened to compansate for the increased load. Conversely, if the average output current of transformer 219 should be excessive, motor 212 and stator 229 would operate at increased speed to reverse the aforedescribed process and to advance the quenching pulses so as to foreshorten the current pulses traversing the thyratrons.

The system of FIG. 4 has been shown and described for the principal purpose of illustrating the use of a discriminator, responsive to angle modulation of load motion, in a control circuit employing asymmetrical pulse-width modulation in accordance with my prior disclosures. It will be understood, however, that the motor 212 of FIG. 4 could also be driven by symmetrically modulated pulses, i.e. a system of the type shown in FIG. 1.

It will be observed that the gating devices 216', 216'' in FIG. 4 are driven from a source 240 of direct current across which they are connected in a push-pull circuit, unlike the devices 16A, 16B of FIG. 1 energized by the alternating-current source 11b. It is, of course, possible to modify the system of FIG. 1 along the lines suggested in FIG. 4, i.e. with a pair of electronic valves driven by direct current, this having been illustrated in FIG. 5 where the controlled rectifiers 316A, 316B are connected across a battery 336 while having their input circuits in series with the secondary windings of respective transformers 319A, 319B controlled by a timing-pulse generator of fixed cadence as in FIG. 1. The stator windings 315A', 315A'' and 315B', 315B'' are connected for alternate energization by the gates 316A, 316B in the same manner as the two halves of winding 219a (FIG. 4) with reference to thyratrons 216', 216''.

Modifications of the specific arrangements described and illustrated, including combinations of compatible features of different embodiments, are of course possible without departing from the spirit and scope of the appended claims.

I claim:

1. A circuit arrangement for imparting controlled periodic motion to a load, comprising electromagnetic coil means for driving said load; an energizing circuit for said coil means; a source of timing pulses of predetermined cadence; a generator of electrical oscillations coupled with said load, said generator having an output subject to angle modulation dependent upon the phasing of said motion with reference to said cadence; discriminator means connected to be energized from said generator; gate means in said energizing circuit adapted to block and unblock the flow of current from said source to said coil means; and control means for said source connected to said discriminator means for altering the timing of said pulses in dependence upon said output, said source being connected to said gate means for periodically triggering same into a blocking condition during successive cycles of said source, the duration of said blocking condition within each cycle of said source being variable in keeping with said angle modulation for compensating departures of said motion from a predetermined phase relationship with said cadence.

2. A circuit arrangement as defined in claim 1 wherein said load is a synchronous motor, said discriminator means being a phase discriminator.

3. A circuit arrangement as defined in claim 1 wherein said load is an induction motor subject to slip, said discriminator means being a frequency discriminator.

4. A circuit arrangement for supplying electric driving energy from a source of electrical energy to a load adapted to execute periodic motion, said load being provided with drive means including at least one pair of alternately energizable electromagnetic coils, comprising a first and a second energizing circuit extending from said source to one and the other of said coils, respectively; first and second gate means included in said first and second energizing circuits, respectively, for controlling the energization of said coils, each of said gate means having two stable states of conductivity and being alternately triggerable from one of said states into the other and vice versa for alternately unblocking and blocking current flow from said source to the respective coil; a signal generator coupled with said load for producing an electrical output varying with the phasing of said periodic motion relative to an alternating reference voltage; and means including said generator for rendering said gate means conductive during respective half-cycles of said reference voltage for periods shorter than said half-cycles whose duration varies in response to said output for compensating departures of said motion from a predetermined phase relationship with said reference voltage.

5. A circuit arrangement for supplying electric driving energy from a source of electrical energy to a load adapted to execute periodic motion, said load being provided with drive means including at least one pair of alternately energizable electromagnetic coils, comprising a first and a second energizing circuit extending from said source to one and the other of said coils, respectively; first and second gate means included in said first and second energizing circuits, respectively, for controlling the energization of said coils, each of said gate means having two stable states of conductivity and being alternately triggerable from one of said states into the other and vice versa for alternately unblocking and blocking current flow from said source to the respective coil; a generator of electrical oscillations coupled with said load for producing an output subject to angle modulation dependent upon the phasing of said periodic motion relative to an alternating reference voltage; and discriminator means energizable by said generator and connected to said gate means for rendering the latter conductive during respective half-cycles of said reference voltage for periods shorter than said half-cycles whose duration varies in response to said angle modulation for compensating departures of said motion from a predetermined phase relationship with said reference voltage.

6. A circuit arrangement for supplying electric driving energy from a source of alternating voltage to a load impedance, comprising: an energizing circuit extending from said source to said impedance; electronic gate means in said circuit, said gate means having two stable states of conductivity and being alternately triggerable from one of said states into the other and vice versa for alternately unblocking and blocking current flow from said source to said impedance; timing means for respectively switching said gate means into one and the other state of conductivity, said timing means being coupled with said source for producing an unblocking signal for said gate means in the first half and a blocking signal for said gate means in the second half of each voltage half-cycle of said source at substantially symmetrical time positions within the half-cycle whereby current flow to said impedance is maintained over a period shorter than said half-cycle; and control means for said timing means adapted to shift said blocking and unblocking signals within each voltage half-cycle to substantially the same extent in opposite directions, thereby varying the duration of said period of current flow while substantially maintaining its phasing with reference to said voltage half-cycles.

7. A circuit arrangement as defined in claim 6 wherein said gate means comprises a controlled solid-state rectifier with gate turn-off.

8. A circuit arrangement for supplying electric driving energy from a source of alternating voltage to a load adapted to execute periodic motion, said load being provided with drive means including at least one electromagnetic coil, comprising: an energizing circuit extending from said source to said coil; electronic gate means in said circuit, said gate means having two stable states of conductivity and being alternately triggerable from one of said states into the other and vice versa for alternately unblocking and blocking current flow from said source to said coil; timing means for supplying two interleaved trains of trigger pulses to said gate means for respectively switching same into one and the other state of conductivity, said timing means being coupled with said source for producing an unblocking pulse for said gate means in the first half and a blocking pulse for said gate means in the second half of each voltage half-cycle of said source at substantially symmetrical time positions within the half-cycle whereby current flow to said coil is maintained over a period shorter than said half-cycle; and control means for said timing means adapted to shift said blocking and unblocking pulses within each voltage half-cycle to substantially the same extent in opposite directions, thereby varying the duration of said period of current flow while substantially maintaining its phasing with reference to said voltage half-cycles.

9. A circuit arrangement for supplying electric driving energy from a source of alternating voltage to a load adapted to execute periodic motion, said load being provided with drive means including at least one pair of alternately energizable electromagnetic coils, comprising: a first and a second energizing circuit extending from said source to one and the other of said coils, respectively; unidirectionally conductive first and second electronic gate means included in said first and second circuits, respectively, with opposite polarity for passing current to said coils at alternate voltage half-cycles of said source respectively assigned to said circuits, each of said gate means having two stable states of conductivity and being each alternately triggerable from one of said states into the other and vice versa for alternately unblocking and blocking current flow from said source to the respective coil; timing means for supplying two interleaved trains of trigger pulses to each of said gate means for respectively switching same into one and the other state of conductivity, said timing means being coupled with said source for producing an unblocking pulse for each gate means in the first half and a blocking pulse for each gate means in the second half of each assigned voltage half-cycle of said source at substantially symmetrical time positions within the half-cycle whereby current flow to the respective coil is maintained over a period shorter than said half-cycle; and control means for said timing means adapted to shift said blocking and unblocking pulses for each gate means within each assigned voltage half-cycle to substantially the same extent in opposite directions, thereby varying the duration of said period of current flow while substantially maintaining its phasing with reference to said voltage half-cycles.

10. A circuit arrangement for supplying electric driving energy from a source of alternating voltage to a load adapted to execute periodic motion, said load being provided with drive means including at least one electromagnetic coil, comprising: an energizing circuit extending from said source to said coil; electronic gate means in said circuit, said gate means having two stable states of conductivity and being each alternately triggerable from one of said states into the other and vice versa for alternately unblocking and blocking current flow from said source to said coil; timing means for supplying two interleaved trains of trigger pulses to said gate means for respectively switching same into one and the other state of conductivity, said timing means being coupled with said source for producing an unblocking pulse for said gate means in the first half and a blocking pulse for said gate means in the second half of each voltage half-cycle of said source at substantially symmetrical time positions within the half-cycle whereby current flow to said coil is maintained over a period shorter than said half-cycle; and a generator of electrical oscillations coupled with said load for producing an output varying with the phasing of said periodic motion relative to said alternating voltage, said generator being connected to said timing means for shifting said blocking and unblocking pulses within each voltage half-cycle to substantially the same extent in opposite directions in response to said output for compensating departures of said motion from a predetermined phase relationship with said alternating voltage, thereby varying the duration of said period of current flow while substantially maintaining its phasing with reference to said voltage half-cycles.

11. A circuit arrangement for supplying electric driving energy from a source of alternating voltage to a load adapted to execute periodic motion, said load being provided with drive means including at least one pair of alternately energizable electromagnetic coils, comprising: a first and a second energizing circuit extending from said source to one and the other of said coils, respectively; unidirectionally conductive first and second electronic gate means included in said first and second circuits, respectively, with opposite polarity for passing current to said coils at alternate voltage half-cycles of said source respectively assigned to said circuits, each of said gate means having two stable states of conductivity and being each alternately triggerable from one of said states into the other and vice versa for alternately unblocking and blocking current flow from said source to the respective coil; timing means for supplying two interleaved trains of trigger pulses to each of said gate means for respectively switching same into one and the other state of conductivity, said timing means being coupled with said source for producing an unblocking pulse for each gate means in the first half and a blocking pulse for each gate means in the second half of each assigned voltage half-cycle of said source at substantially symmetrical time positions within the half-cycle whereby current flow to the respective coil is maintained over a period shorter than said half-cycle; and a generator of electrical oscillations coupled with said load for producing an output varying with the phasing of said periodic motion relative to said alternating voltage, said generator being connected to said timing means for shifting said blocking and unblocking pulses for each gate means within each assigned voltage half-cycle to substantially the same extent in opposite directions in response to said output for compensating departures of said motion from a predetermined phase relationship with said alternating voltage, thereby varying the duration of said period of current flow while substantially maintaining its phasing with reference to said voltage half-cycles.

12. The combination with an electromagnetic motor and a source of alternating voltage therefor, said motor being provided with at least one electromagnetic coil, of an energizing circuit extending from said source to said coil; electronic gate means in said circuit, said gate means having two stable states of conductivity and being alternately triggerable from one of said states into the other and vice versa for alternately unblocking and blocking current flow from said source to said coil; timing means for supplying two interleaved trains of trigger pulses to said gate means for respectively switching same into one and the other state of conductivity, said timing means being coupled with said source for producing an unblocking pulse for said gate means in the first half and a blocking pulse for said gate means in the second half of each voltage half-cycle of said source at substantially symmetrical time positions within the half-cycle whereby current flow to said coil is maintained over a period shorter than said half-cycle; and control means for said timing means adapted to shift said blocking and unblocking pulses within each voltage half-cycle to substantially the same extent in opposite directions, thereby varying the duration of said period of current flow while substantially maintaining its phasing with reference to said voltage half-cycles.

13. The combination with an electromagnetic motor and a source of alternating voltage therefor, said motor being provided with at least one pair of alternately energizable electromagnetic coils, of a first and a second energizing circuit extending from said source to one and the other of said coils, respectively; unidirectionally conductive first and second electronic gate means included in said first and second circuits, respectively, with opposite polarity for passing current to said coils at alternate voltage half-cycles of said source respectively assigned to said circuits, each of said gate means having two stable states of conductivity and being each alternately triggerable from one of said states into the other and vice versa for alternately unblocking and blocking current flow from said source to the respective coil; timing means for supplying two interleaved trains of trigger pulses to each of said gate means for respectively switching same into one and the other state of conductivity, said timing means being coupled with said source for producing an unblocking pulse for each gate means in the first half and a blocking pulse for each gate means in the second half of each assigned voltage half-cycle of said source at substantially symmetrical time positions within the half-cycle whereby current flow to the respective coil is maintained over a period shorter than said half-cycle; and control means for said timing means adapted to shift said blocking and unblocking pulses for each gate means within each assigned voltage half-cycle to substantially the same extent in opposite directions, thereby varying the duration of said period of current flow while substantially maintaining its phasing with reference to said voltage half-cycles.

14. The combination defined in claim 13 wherein said motor has a rotary armature and at least two pairs of stator poles interleavedly spaced around said armature, said coils being respectively wound on said pairs of stator poles.

15. The combination defined in claim 13 wherein said motor has an armature linearly oscillatable along an axis, said coils surrounding said armature at axially spaced locations.

16. The combination with an electromagnetic motor and a source of alternating voltage therefor, said motor being provided with at least one electromagnetic coil, of an energizing circuit extending from said source to said coil; electronic gate means in said circuit, said gate means having two stable states of conductivity and being alternately triggerable from one of said states into the other and vice versa for alternately unblocking and blocking current flow from said source to said coil; timing means for supplying two interleaved trains of trigger pulses to said gate means for respectively switching same into one and the other state of conductivity, said timing means being coupled with said source for producing an unblocking pulse for said gate means in the first half and a blocking pulse for said gate means in the second half of each voltage half-cycle of said source at substantially symmetrical time positions within the half-cycle whereby current flow to said coil is maintained over a period shorter than said half-cycle; and a generator of electrical oscillations coupled with said motor for producing an output varying with the phasing of the motor motion relative to said alternating voltage, said generator being connected to said timing means for shifting said blocking and unblocking pulses within each voltage half-cycle to substantially the same extent in opposite directions in response to said output for compensating departures of said motion from a predetermined phase relationship with said alternating voltage, thereby varying the duration of said period of current flow while substantially maintaining its phasing with reference to said voltage half-cycles.

17. The combination with an electromagnetic motor and a source of alternating voltage therefor, said motor being provided with at least one pair of alternately energizable electromagnetic coils, of a first and a second energizing circuit extending from said source to one and the other of said coils, respectively; unidirectionally conductive first and second electronic gate means included in said first and second circuits, respectively, with opposite polarity for passing current to said coils at alternate voltage half-cycles of said source respectively assigned to said circuits, each of said gate means having two stable states of conductivity and being each alternately triggerable from one of said states into the other and vice versa for alternately unblocking and blocking current flow from said source to the respective coil; timing means for supplying two interleaved trains of trigger pulses to each of said gate means for respectively switching same into one and the other state of conductivity, said timing means being coupled with said source for producing an unblocking pulse for each gate means in the first half and a blocking pulse for each gate means in the second half of each assigned voltage half-cycle of said source at substantially symmetrical time positions within the half-cycle whereby current flow to the respective coil is maintained over a period shorter than said half-cycle; and a generator of electrical oscillations coupled with said motor for producing an output varying with the phasing of the motor motion relative to said alternating voltage, said generator being connected to said timing means for shifting said blocking and unblocking pulses for each gate means within each assigned voltage half-cycle to substantially the same extent in opposite directions in response to said output for compensating departures of said motion from a predetermined phase relationship with said alternating voltage, thereby varying the duration of said period of current flow while substantially maintaining its phasing with reference to said voltage half-cycles.

18. A circuit arrangement for imparting controlled periodic motion to a load, comprising electromagnetic coil means for driving said load; an energizing circuit for said coil means; a source of alternating voltage connected in said circuit; a generator of electrical oscillations coupled with said load, said generator having an output subject to angle modulation dependent upon the phasing of said motion with reference to said alternating voltage; discriminator means connected to be energized from said generator; gate means in said energizing circuit adapted to block and unblock the flow of current from said source to said coil means; and control means for said gate means connected to said discriminator means for periodically triggering said gate means into a blocking condition during successive voltage cycles of said source, the duration of said blocking condition within each voltage cycle being variable in keeping with said angle modulation for compensating departures of said motion from a predetermined phase relationship with said alternating voltage.

19. A circuit arrangement for supplying electric driving energy from a source of alternating voltage to a load adapted to execute periodic motion, said load being provided with drive means including at least one pair of alternately energizable electromagnetic coils, comprising a first and a second energizing circuit extending from said source to one and the other of said coils, respectively; unidirectionally conductive first and second gate means included in said first and second energizing circuits, respectively, with relatively opposite polarity for passing current to said coils at different voltage half-cycles of said source, each of said gate means having two stable states of conductivity and being alternately triggerable from one of said states into the other and vice versa for alternately unblocking and blocking current flow from said source to the respective coil; a signal generator coupled with said load for producing an electrical output varying with the phasing of said periodic motion relative to said alternating voltage; and means including said generator for rendering said gate means conductive during respective voltage half-cycles of said source for periods shorter than said half-cycles whose duration varies in response to said output for compensating departures of said motion from a predetermined phase relationship with said alternating voltage.

20. A circuit arrangement for supplying electric driving energy from a source of alternating voltage to a load adapted to execute periodic motion, said load being provided with drive means including at least one pair of alternately energizable electromagnetic coils, comprising a first and a second energizing circuit extending from said source to one and the other of said coils, respectively; unidirectionally conductive first and second gate means included in said first and second energizing circuits, respectively, with relatively opposite polarity for passing current to said coils at different voltage half-cycles of said source, each of said gate means having two stable states of conductivity and being alternately triggerable from one of said states into the other and vice versa for alternately unblocking and blocking current flow from said source to the respective coil; a generator of electrical oscillations coupled with said load for producing an output subject to angle modulation dependent upon the phasing of said periodic motion relative to said alternating voltage; and discriminator means energizable by said generator and connected to said gate means for rendering the latter conductive during respective voltage half-cycles of said source for periods shorter than said half-cycles whose duration varies in response to said angle modulation for compensating departures of said motion from a predetermined phase relationship with said alternating voltage.

References Cited by the Examiner

UNITED STATES PATENTS

| | | | |
|---|---|---|---|
| 3,008,075 | 11/1961 | Scott | 318—341 X |
| 3,079,539 | 2/1963 | Guerth | 318—341 X |
| 3,083,327 | 3/1963 | Byloff | 318—341 X |
| 3,207,931 | 9/1965 | Pintell | 307—106 |

FOREIGN PATENTS 717,726  11/1954  Great Britain.

ORIS L. RADER, *Primary Examiner.*

G. FRIEDBERG, *Assistant Examiner.*